United States Patent [19]

Schlenk

[11] Patent Number: 4,563,733
[45] Date of Patent: Jan. 7, 1986

[54] STARTUP CIRCUIT FOR A SWITCHED POWER SUPPLY

[75] Inventor: Manfred Schlenk, Bobingen, Fed. Rep. of Germany

[73] Assignee: Siemens Aktiengesellschaft, Berlin & Munich, Fed. Rep. of Germany

[21] Appl. No.: 586,745

[22] Filed: Mar. 6, 1984

[30] Foreign Application Priority Data

Mar. 22, 1983 [DE] Fed. Rep. of Germany ....... 3310380

[51] Int. Cl.⁴ .............................................. H02P 1/00
[52] U.S. Cl. .................................... 323/284; 323/901
[58] Field of Search ............... 323/276, 901, 908, 282, 323/284; 363/55, 49, 56; 307/26 S, 296 R; 361/29

[56] References Cited

U.S. PATENT DOCUMENTS 4,489,369 12/1984 Ginsberg ............................. 363/49

Primary Examiner—William H. Beha, Jr.
Assistant Examiner—Jeffrey Sterrett
Attorney, Agent, or Firm—Hill, Van Santen, Steadman & Simpson

[57] ABSTRACT

A startup circuit has an undervoltage monitoring unit and a pulse width modulator PBM with at least one soft start input and one enable input. When switching on the power pack, the undervoltage monitoring unit is disabled until the voltage level at the output has reached a rated value. Outputs of two comparators are connected to the enable input of the pulse width modulator over a NAND gate. A capacitor chargeable via a resistor is applied to the first input of the first comparator with a controllable electronic switch connected in parallel to the capacitor. A first reference voltage is applied to the second input of the first comparator and a second reference voltage equal to or lower than the first reference voltage is connected to the first input of the second comparator. The output voltage of the power pack is connected to the second input thereof. The voltage generated at the capacitor is connected to the soft start input of the pulse width modulator over a biased rectifier whose bias voltage is equal to or lower than the first reference voltage. A control circuit comprising an input for switch-on instructions and an input for switch-off instructions is connected at its output to the control input of the electronic switch. The enable input of the pulse width modulator is also connected to receive the switch-off instruction.

4 Claims, 1 Drawing Figure

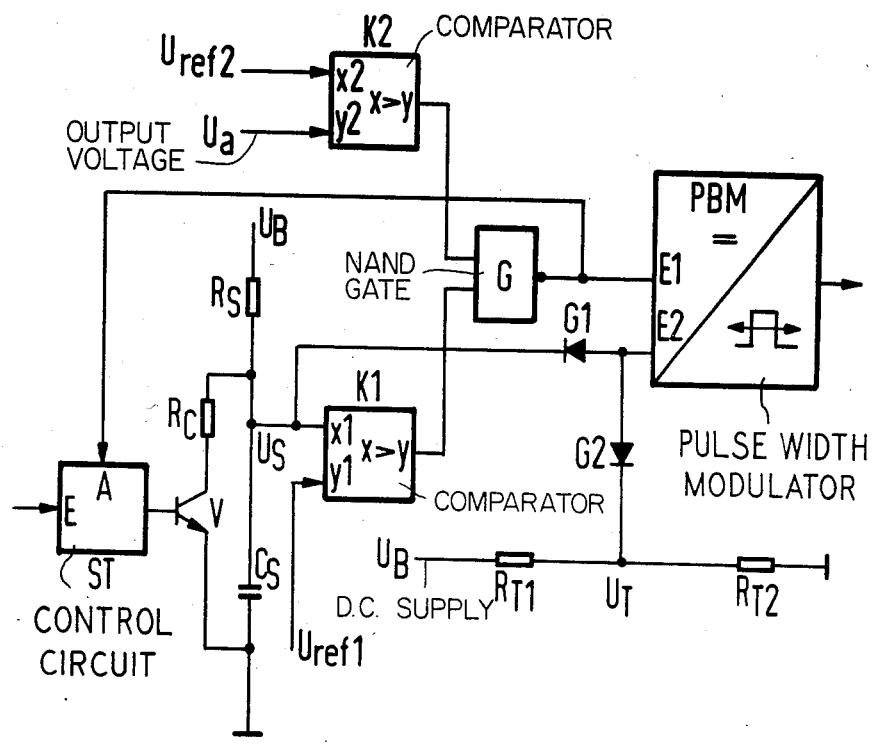

STARTUP CIRCUIT FOR A SWITCHED POWER SUPPLY

BACKGROUND OF THE INVENTION

The invention relates to a startup circuit for a switched power supply having an undervoltage monitor and pulse width modulator as a control portion that has at least one immediate start input and one inable input.

Switched power supplies usually have a monitoring unit that disconnects the power supply via a control and regulating unit given downward movement of a specific value of the output voltage. In order to enable the startup operation of the power supply, an undervoltage monitoring unit must be disabled simultaneously with the startup instruction.

This usually occures in such manner that a one-shot multivibrator is started with the startup instruction. The one-shot multivibrator disables the undervoltage monitoring unit and thus enables the control and regulating unit of the power supply. After the lapse of a time defined by the wiring of the one-shot multivibrator, the undervoltage monitoring unit is reconnected. In addition to the high susceptibility of one-shot multivibrators to disruption, the disadvantage of this principle is that the time constants ofthe one-shot multivibrator and soft start circuit must be very precisely matched to one another in order to guarantee a reliable startup of the power supply.

SUMMARY OF THE INVENTION

An object of the present invention is to create a startup circuit for a switched power supply having an undervoltage monitoring unit and a pulse width modulator as the regulating portion thereof and which disables the undervoltage monitoring unit during the startup operation of the switched power supply by simple techniques.

In order to achieve this object, the startup circuit for a switched power supply is designed such that the outputs of two comparators are connected by a NAND gate to the enable input of the pulse width modulator. Each of the comparators exhibit two respective inputs. A chargeable capacitor is applied to the first input of the first comparator via a resistor, a controllable electronic switch is connected parallel to the chargeable capacitor, and a first reference voltage is connected to the second input of the first comparator. A second reference voltage equal to or lower than the first reference voltage is connected to the first input of the second comparator and the output voltage of the switched power supply is connected to its second input. The voltage generated at the capacitor is connected to the soft start input of the pulse width modulator via a biased rectifier whose bias voltage is equal to or lower than the first reference voltage. A control circuit having an input for startup instructions and having an input for switch-off instructions is connected at its output side to the control input of the electronic switch, and the enable input of the pulse width modulator is connected to the input for the connect instruction.

The difficult matching of time constants of different circuits to one another is avoided by means of these techniques.

The controllable electronic switch can thus advantageously be a transistor having a resistor lying in its collector circuit. The bias voltage of the rectifier can be set via a voltage divider in a simple manner.

BRIEF DESCRIPTION OF THE DRAWINGS

The drawing FIGURE shows a schematic diagram of a start-up system for a switched power supply according to the invention.

DESCRIPTION OF THE PREFERRED EMBODIMENTS

The FIGURE shows the regulating portion and the startup circuit for a switched power supply. The regulating portion thus consists of the pulse width modulator PBM that has two inputs E1 and E2. The input E2 is the so-called soft start input that guarantees a soft "startup" of the overall switched power supply since a constant voltage slowly increasing at this input slowly changes the pulse duration ratio and thus the output voltage $U_a$ of the overall power supply.

The input E1 is the so-called enable input at which an enable or inhibit of the overall power supply is achieved by means of applying specific signals.

The enable input is connected to the output of the NAND gate G whose two inputs are connected to the outputs of two comparators K1, K2.

A voltae $U_S$ that can be generated at the capacitor $C_S$ is supplied to the first comparator at its x-input whereas the voltage $U_{ref1}$ is present at its y-input. The comparator K2 likewise has a reference voltage $U_{ref2}$ at its x-input whereas the output voltage $U_a$ of the switched power supply is supplied to its y-input. The transistor V having a resistor $R_C$ in its collector circuit lies parallel to the capacitor $C_S$. The transistor V is driven at its base by a control circuit ST to whose input E the startup instructions are supplied. A connection is simultaneously provided from the enable output E1 to the input responsive for supplying switchoff instructions.

The functioning of the circuit shall now be explained in detail.

Dependent on the level of the constant voltage at the soft start input E2 of the pulse width modulato PBM, the pulse-duty factor of the switched power supply is varied and, thus, the output voltage of the switched power supply is varied. The maximum pulse-duty ratio is defined via the resistance divider $R_{T1}$, $R_{T2}$. A voltage generated at the capacitor $C_S$ is connected to the soft start input E2 of the pulse width modulator by a biased rectifier G1 having a bias voltage applied thereto equal to or smaller than the reference voltage $U_{ref1}$. Diode G1 is biased via a diode G2 connected to the voltage divider $R_{T1}$, $R_{T2}$ fed from a DC supply $U_B$. The first reference voltage must therefore be selected at $U_{ref1}$ $32U_T$ in order to guarantee a sure startup of the switched power supply. The pulse duration modulator is enabled over the soft start input E2. When the transistor V is inhibited with a startup instruction by the control circit ST, then the voltage at the input E2 begins to rise in accordance with the time constant $R_S \cdot C_S$, as does the voltage of the switched power supply. When the voltage at the capacitor $C_S$ exceeds the value $U_{ref1}$, then the output of the comparator K1 assumes the Hi level and thus connects the comparator K2 for the undervoltage monitoring unit to the enable input of the control and regulating unit through the NAND gate G. If no fault condition of the power supply existed during the runup operation of the output voltage $U_a$, then the output of the comparator K2 has assumed the low level in the meantime since the output voltage $U_a$ has exceeded the value $U_{ref2}$. The pulse duration modulator remains switched on. Should the output voltage $U_a$ not have reached the value $U_{ref2}$—due, for example, to a short—then the H level is retained at the output of the second comparator K2, and the pulse duration modulator is then inhibited over the enable input E1 and the control circuit ST is reset.

Depending on the design of the gate G, the circuit can be adapted to various types of pulse duration modulators. The first reference voltage $U_{ref1}$ must thus always be greater than or equal to the second reference voltage $U_{ref2}$.

In the preferred embodiment of the invention, the control circuit ST is an RS flip-flop having the inputs E and A shown in the drawing figure.

Although various minor modifications and variations might be proposed by those skilled in the art, it will be understood that I wish to include within the claims of the patent warranted hereon all such changes and modifications as reasonably come within my contribution to the art.

I claim as my invention:

1. A startup system for a switched power supply having an undervoltage monitoring unit and a pulse width modulator as a regulating portion with at least one soft start input and one enable input, comprising:

first and second comparators whose outputs are connected by a NAND gate to the enable input of the pulse width modulator, said comparators each having two respective inputs;

a capacitor chargeable via a resistor, the capacitor being connected to the first input of the first comparator;

a controllable electronic switch connected parallel to said chargeable capacitor;

a first reference voltage connected to the second input of said first comparator;

a second reference voltage equal to or smaller than said first reference voltage connected to the first input of the second comparator;

an output voltage of the switched power supply connected to the second input of said second comparator;

a voltage generated at said capacitor being connected to the soft start input of the pulse width modulator by a biased rectifier having a bias voltage applied thereto equal to or smaller than said first reference voltage;

a control circuit comprising an input for startup instructions, a input for switching off instructions, and an output connected to a control input of said electronic switch; and the enable input of said pulse width modulator being connected to said input for the switchoff instructions.

2. A startup circuit according to claim 1 wherein the controllable electronic switch is a transistor having a resistor in its collector circuit.

3. A startup circuit according to claim 1 wherein a voltage divider is connected to provide said bias voltage of the biased rectifier.

4. A startup system for a switched power supply having a pulse width modulator with an associated soft start input and enable input, comprising:

first and second comparators whose outputs are connected by a logic gate to the enable input of the pulse width modulator, said comparators each having two respective inputs;

a capacitor chargeable via a voltage fed through a resistor, the capacitor being connected to the first input of the first comparator;

a controllable electronic switch connected to discharge the capacitor;

a first reference voltage connected to the second input of the first comparator;

a second reference voltage connected to the first input of the second comparator;

an output voltage of the switched power supply connected to the second input of the second comparator;

one end of the capacitor being connected to the soft start input of the pulse width modulator via a rectifier;

bias means connected to the rectifier; p1 a control circuit comprising an input for startup instructions, an input for switchoff instructions, and an output connected to a control input of the electronic switch; and the enable input of the pulse width modulator being connected to the input for the switchoff instructions.

* * * * *